United States Patent
Geertman

(10) Patent No.: US 11,937,610 B2
(45) Date of Patent: Mar. 26, 2024

(54) SYSTEM AND METHOD FOR OPERATING A POULTRY STUNNING FACILITY

(71) Applicant: Midway Machine Technologies, Inc., Zeeland, MI (US)

(72) Inventor: Terry B. Geertman, West Olive, MI (US)

(73) Assignee: Midway Machine Technologies, Inc., Zeeland, MI (US)

( * ) Notice: Subject to any disclaimer, the term of this patent is extended or adjusted under 35 U.S.C. 154(b) by 775 days.

(21) Appl. No.: 16/929,822

(22) Filed: Jul. 15, 2020

(65) Prior Publication Data
US 2021/0015111 A1 Jan. 21, 2021

Related U.S. Application Data

(60) Provisional application No. 62/874,096, filed on Jul. 15, 2019.

(51) Int. Cl.
*A22B 7/00* (2006.01)
*A01K 45/00* (2006.01)
*A22B 3/08* (2006.01)
*A22B 5/02* (2006.01)

(52) U.S. Cl.
CPC ............ *A22B 7/002* (2013.01); *A01K 45/005* (2013.01); *A22B 3/086* (2013.01); *A22B 5/02* (2013.01)

(58) Field of Classification Search
CPC ........... A22B 7/002; A22B 3/086; A22B 5/02; A01K 45/005
USPC ......................................................... 452/53
See application file for complete search history.

(56) References Cited

U.S. PATENT DOCUMENTS

| | | | | |
|---|---|---|---|---|
| 4,092,761 A | * | 6/1978 | McWhirter | A22B 3/086 452/58 |
| 5,954,572 A | * | 9/1999 | Kettlewell | H05C 1/04 452/58 |
| 6,056,637 A | * | 5/2000 | Freeland | A22C 21/0015 452/53 |
| 6,109,215 A | * | 8/2000 | Jerome | A01K 45/005 119/845 |
| 6,848,987 B2 | | 2/2005 | Draft | |

(Continued)

OTHER PUBLICATIONS

Karczewski, "CO2 stunning is considered one of the most reliable slaughter methods in terms of animal welfare and meat quality," Meat + Poultry, Nov. 2016, pp. 25-33.

(Continued)

*Primary Examiner* — Richard T Price, Jr.
(74) *Attorney, Agent, or Firm* — Gardner, Linn, Burkhart & Ondersma LLP

(57) ABSTRACT

A method and system for receiving, processing, and stunning poultry in a poultry processing facility includes an receiving system for receiving and unloading live poultry from a transport vehicle, a controlled atmosphere stunning system, a stunned poultry hanging station for receiving and transferring stunned poultry to another facility for further processing, such as slaughtering the stunned poultry. Shuttle conveyors and cage pushers coordinate to unload cages of live poultry from the transport vehicle and begin conveying the cages toward the stunning system. Accumulators, cage de-stackers, cage stackers, cage washers, tilted conveyors, and other features may be included with the system.

18 Claims, 18 Drawing Sheets

(56) References Cited

U.S. PATENT DOCUMENTS

| | | | |
|---|---|---|---|
| 7,448,943 | B1 | 11/2008 | Woodford et al. |
| 7,771,255 | B2 | 8/2010 | Cattaruzzi |
| 8,176,879 | B1* | 5/2012 | Anderson ............ A01K 45/005 |
| | | | 119/846 |
| 8,272,926 | B2 | 9/2012 | Lang et al. |
| 8,323,080 | B2 | 12/2012 | Lang et al. |
| 8,591,297 | B2 | 11/2013 | Lang et al. |
| 10,757,949 | B1 | 9/2020 | Geertman |
| 2006/0172673 | A1* | 8/2006 | Cattaruzzi .............. A22B 3/005 |
| | | | 452/57 |

OTHER PUBLICATIONS

Dimarcantonio-Brown, "Michigan turkey producers wins food quality award," Jun. 2010, pp. 23-25, 27, and 29, retrieved from foodquality.com.

* cited by examiner

SYSTEM AND METHOD FOR OPERATING A POULTRY STUNNING FACILITY

CROSS REFERENCE TO RELATED APPLICATION

The present invention claims the benefit of U.S. provisional application Ser. No. 62/874,096, filed Jul. 15, 2019, which is hereby incorporated by reference in its entirety.

FIELD OF THE INVENTION

The present invention relates to devices and methods for operation and management of a poultry processing plant including a controlled-atmosphere-stunning (CAS) system for stunning of poultry, such as chickens.

BACKGROUND OF THE INVENTION

Controlled atmosphere stunning of chicken, turkeys, and other poultry is a process used at the incoming or intake end of a poultry processing plant, in which a breathable non-oxygen gas is substituted for at least a portion of the atmospheric air that is initially in and around the cage or containment area for the poultry, to thereby deplete that local atmosphere of oxygen. Commonly used non-oxygen gases include nitrogen and carbon dioxide, both of which are found in atmospheric air. For animal welfare and meat quality purposes, it is desirable for the poultry or livestock to breathe the oxygen-depleted atmosphere without becoming alarmed or attempting to escape their confines, which can result in unintended harm to the animals and reduced meat quality due to bruising and broken legs or wings. From both a plant production efficiency standpoint and animal welfare standpoint, it is preferred for the stunning process to take place as quickly and humanely as possible, while minimizing the wasting of breathable non-oxygen gas.

SUMMARY OF THE INVENTION

The present invention provides a processing facility and management system for receiving, processing, and stunning poultry in a poultry stunning system, and a method for processing live poultry through a processing facility including a controlled-atmosphere-stunning (CAS) system, where the CAS system stuns poultry with increasing concentrations of carbon dioxide ($CO_2$) or other asphyxiant, non-oxygen, gas.

According to one form of the present invention, a poultry processing system includes an intake or receiving module to receive a poultry transport vehicle, such as a semi-truck with stacks of cages of live poultry transported thereon, and unloads the cages of live poultry from the transport vehicle to transport the cages of live poultry along a conveyor system through the poultry processing system for processing. A poultry stunning system is provided downstream of the receiving module and provides a controlled-atmosphere system to stun live poultry to a state of "irreversible stun" to facilitate further processing, such as slaughter of the poultry. The CAS system reduces or eliminates resistance from the poultry animals without the animals showing signs of stress or escape actions. The CAS system contains elevated levels or noxious concentrations of an asphyxiant gas, such as carbon dioxide, argon, or nitrogen. The stunned poultry are transported along the conveyor system from the stunning system to a stunned poultry retrieval or hanging station where operators retrieve the stunned poultry animals from their cages and transfer them to a slaughter facility for further processing, such as along an overhead cable conveyor or shackle line.

In one aspect, a control system is included in the poultry processing facility to control and regulate the flow of cages throughout the facility and to adjust the concentrations of asphyxiant gas in the poultry stunning system. Accumulator conveyors are disposed along the conveyor system and are controlled by the control system to regulate the flow of poultry at various locations within the poultry processing facility, such as prior to entrance into the stunning facility or prior to entrance into the poultry hanging station.

Upon entry of the CAS, the animals willingly breathe in the initial local atmosphere containing elevated $CO_2$, substantially without resistance or showing signs of stress or escape actions, and are relaxed as they take further breaths and begin to lose consciousness. The animals then progress to subsequent chambers of the stunning system, having more elevated levels of $CO_2$, until a final chamber is reached, at which point the animals are in a state of irreversible stun. With the animals in a state of irreversible stun, they can be removed from the final chamber and moved to an area having a normal atmosphere, and the animals will not regain consciousness. The irreversibly stunned animals can then be handled manually by plant personnel or hangers, who can shackle the stunned animals to a "shackle line" or conveyor system that moves the animals to a slaughter area and then on to subsequent processing.

According to another form of the present invention, a system of poultry cage pushers and shuttle conveyors are disposed on opposite sides of a drive path in an intake or receiving module. The cage pushers push stacks of cages from one side of the transport vehicle toward a shuttle conveyor on the opposite side of the transport vehicle to unload stacks of cages from the transport vehicle. The shuttle conveyor is disposed on a track that is perpendicular to the drive path and the shuttle conveyor can slide, move, or shuttle along the track between a conveying position located at a distance away from the drive path and a receiving position that is substantially next to or proximate the drive path. In the receiving position, the shuttle conveyor can receive cages or stacks of cages from the transport vehicle as the cage pusher pushes them toward the shuttle conveyor. In the conveying position, the shuttle conveyor is substantially in-line with downstream conveyors to convey the stacks of cages into the poultry processing system for processing. The cage pushers can be configured to push a single stack of cages toward the shuttle conveyor, or can be configured to push a number of stacks of cages that correspond in overall depth of cages to the width of the conveyor surface of the shuttle conveyors.

In one aspect, a leveling system is included in the receiving module to ensure that the conveyor surface of the shuttle conveyors, the cage pushers, and the cage support surface of the transport vehicle are at substantially equal heights to allow for substantially interference-free unloading of the live poultry from the transport vehicle, while also limiting any jostling or sudden movements of the cages. Optionally, the leveling system is disposed along the drive path of the receiving module to adjust the elevation of the transport vehicle to a required elevation proximate the shuttle conveyors and cage pushers. In another aspect, the leveling system may be configured to adjust the elevations of the pushers and conveyors to a desired elevation proximate the cage support surface of the transport vehicle.

In another aspect of the present invention, a half-stack cage destacker is disposed downstream of the receiving module and de-stacks full stacks of cages into half-stacks, such that a full stack of ten cages would be destacked into a half-stack of five cages high, for example. An empty cage inspection station is disposed downstream from the half-stack destacker and the inspection station inspects half-stacks of cages to determine if an entire half-stack of cages is empty or if poultry are present in the cages. The empty cage inspection station may include load cells, cameras, or other instruments to determine if poultry animals are present in any of the half-stack of cages. If it is determined at the inspection station that the half-stack of cages are empty, the inspection station discharges the empty stack of cages to an intermediate loading zone where the empty half-stacks can be loaded onto an empty or partially empty transport vehicle to be transported out of the processing facility. If the inspection station determines that the half-stack includes poultry, the half-stack is transferred to a receiving conveyor system to transport the cages of live poultry toward the stunning system.

In yet another aspect, an inspector or operator is positioned downstream of the inspection station where the operator inspects the half-stacks to determine if any of the individual cages in the half-stack are empty. If an empty cage is detected, the inspector removes the empty cage from the half-stack and transfers it to the intermediate loading zone. The remaining cages of the half-stack are conveyed to a sorting accumulator, which regulates the flow of half-stacks of cages onto a further conveyor. The sorting accumulator may be configured to regulate the flow of half-stacks onto more than one further conveyors, such that more than one adjacent poultry processing conveyor line may operate simultaneously.

In still another aspect, a single cage destacker is disposed downstream of the sorting accumulator on each of the further conveyors to de-stack the half-stacks to single cages. The single cages are conveyed from the single cage destacker toward the stunning system. Optionally, an inspector located between the single cage destacker and the stunning system inspects the single cages to determine if any of the poultry are already dead, or dead-on-arrival (DOA), and removes any DOA from the cage. The inspector may also count the number of live poultry animals in each cage and enter that information into a control system linked to a poultry processing system controller to adjust the processing time of the system or adjust the concentrations of gas in the stunning system to accommodate the number of animals in the cages. The conveyor downstream of the single cage destacker may include a tilted or angled conveyor surface angling downward toward the inspector to aid the inspector in inspecting for DOA animals and counting the animals in each cage. The tilted conveyor may be set at a ten degree angle relative to a horizontal plane, sloping downward toward where the inspector is located.

In a further aspect, upon discharge of the poultry cages from the CAS stunning system, the cages of stunned poultry are conveyed to a stunned poultry retrieval or hanging station. Operators or hangers located at the hanging station remove the stunned poultry animals from their cages and transfer them to a slaughter or killing facility. An overhead conveyer cable or shackle line system may be included in the poultry processing system adjacent to the hanging area to transfer the stunned poultry animals to the slaughter facility. Operators can hang individual stunned poultry animals on a poultry receiver disposed on the shackle line to be transported from the hanging area to a slaughter or kill facility. The cage conveyor in the hanging area includes a tilted, sloped, or angled conveying surface to aid the hangers in removing the stunned poultry from their cages. The angle of the conveyor may be set at forty-five degrees relative to a horizontal plane and sloped downwards toward the location of the hanger. The angled conveying surface utilizes gravity to force the stunned poultry animals downward to the low side of the cage to reduce reaching by the hanger while the hanger retrieves the stunned poultry from the cage. After all poultry animals are removed from a cage, that cage is conveyed out of the hanging area to an empty cage handling system for transferring the empty cages to a final loading zone to be loaded on a transport vehicle.

In a still further aspect, the empty cage handling system includes an empty cage washing system to clean the empty cages prior to the cages being transported out of the facility and possibly to a farm to be re-filled with live poultry. The cage washing system may disinfect the empty cages. A cage stacker downstream of the cage washer stacks individual cages into stacks of cages, such as stacks of ten cages or stacks of twelve cages. The stacks of cages are conveyed into a final loading zone in the processing facility where they can be loaded onto an empty or partially empty poultry transport vehicle.

Therefore, the poultry processing facility and method of the present invention enables poultry processors to humanely and efficiently receive, process, and stun live poultry animals, such as chickens, for subsequent processing. The CAS uses breathable non-oxygen gas such as carbon dioxide. Once irreversibly stunned, the stunned poultry are transported to a stunned poultry hanging station where operators transfer the stunned poultry for further processing.

These and other objects, advantages, purposes and features of the present invention will become apparent upon review of the following specification in conjunction with the drawings.

DESCRIPTION OF THE PREFERRED EMBODIMENTS

Figure 1A:
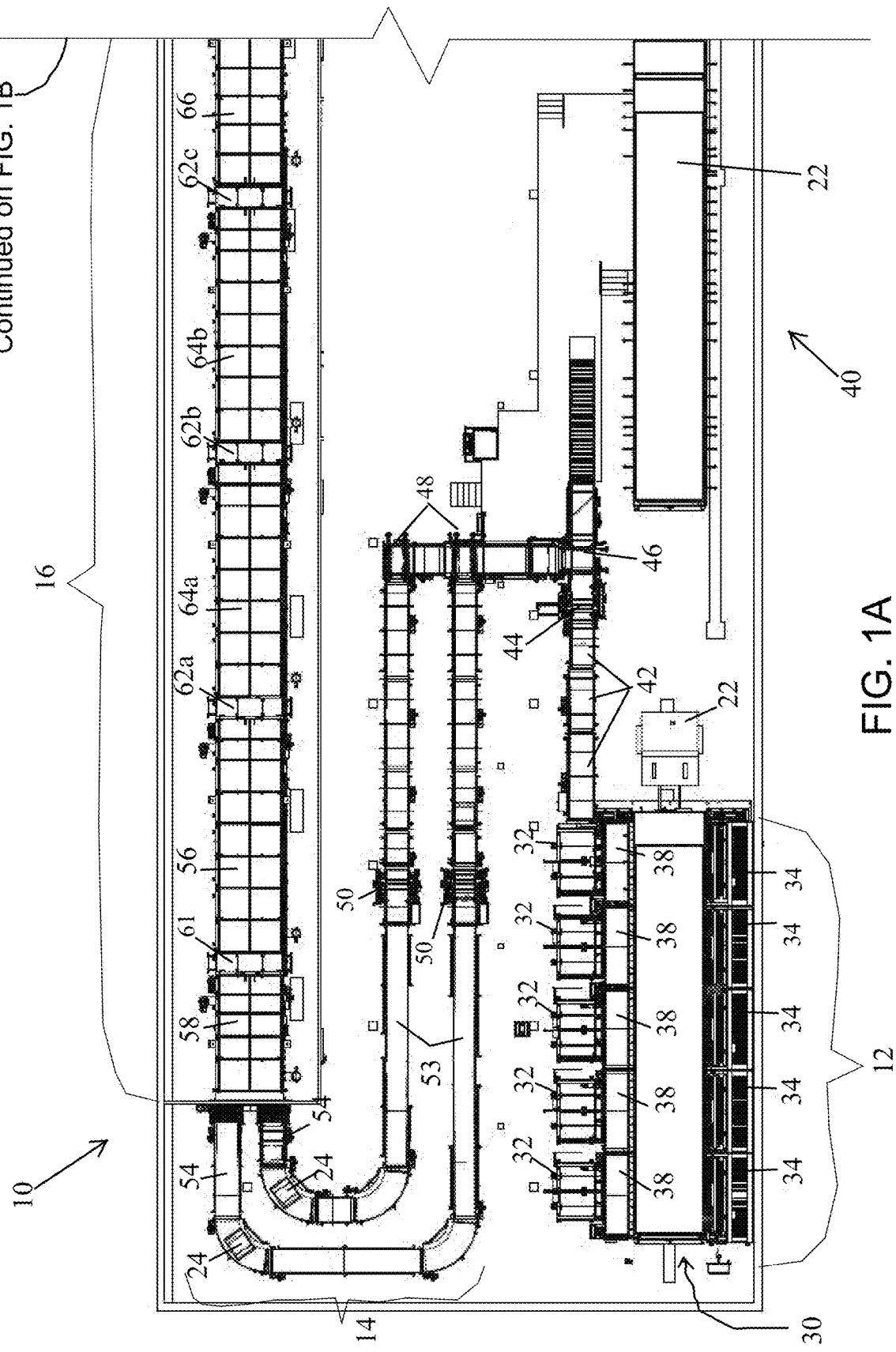
FIGS. 1A-1B are a split top plan view of a poultry processing facility including a controlled-atmosphere-stunning (CAS) system in accordance with the present invention.
Figure 1B:
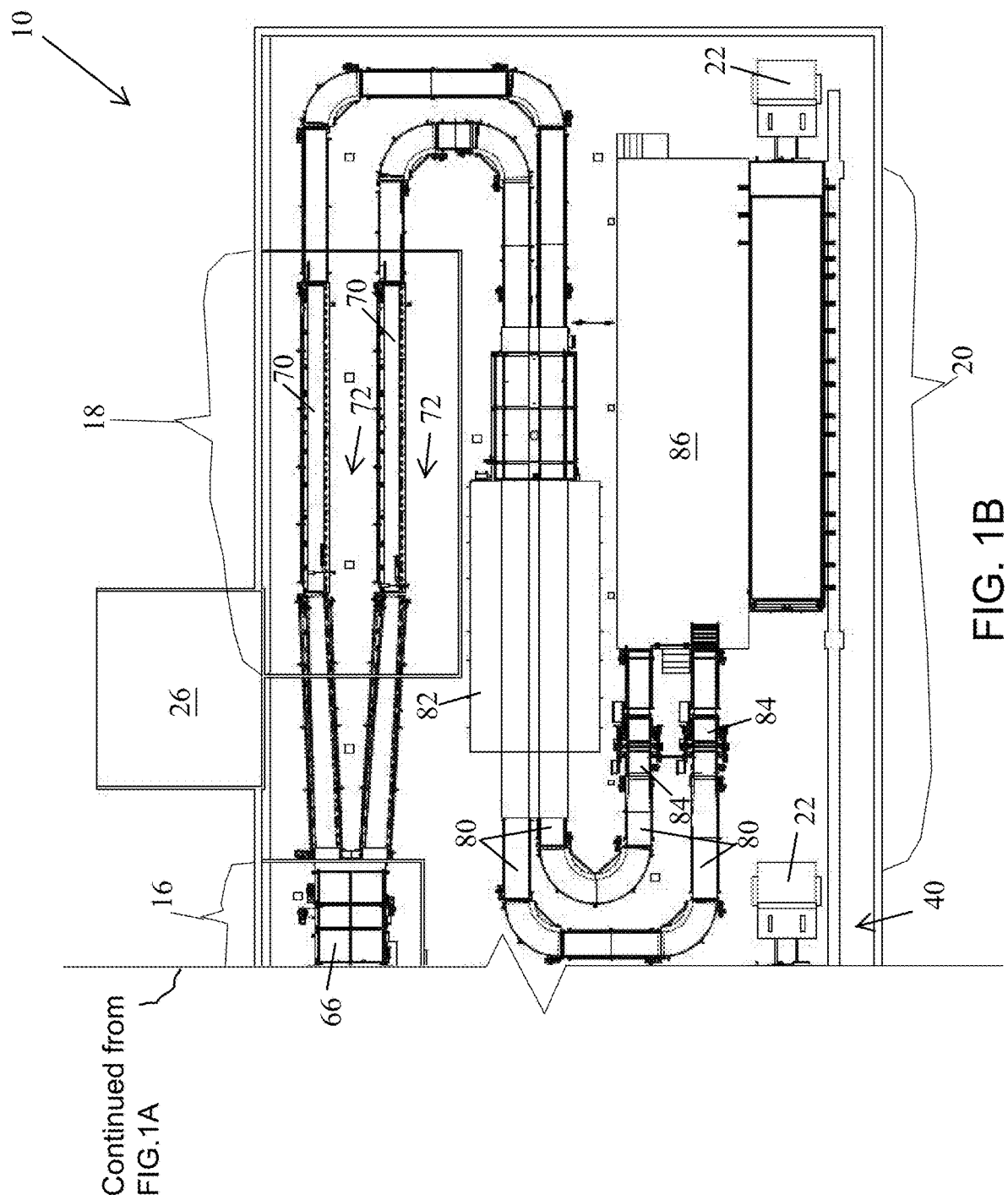
Figure 2:
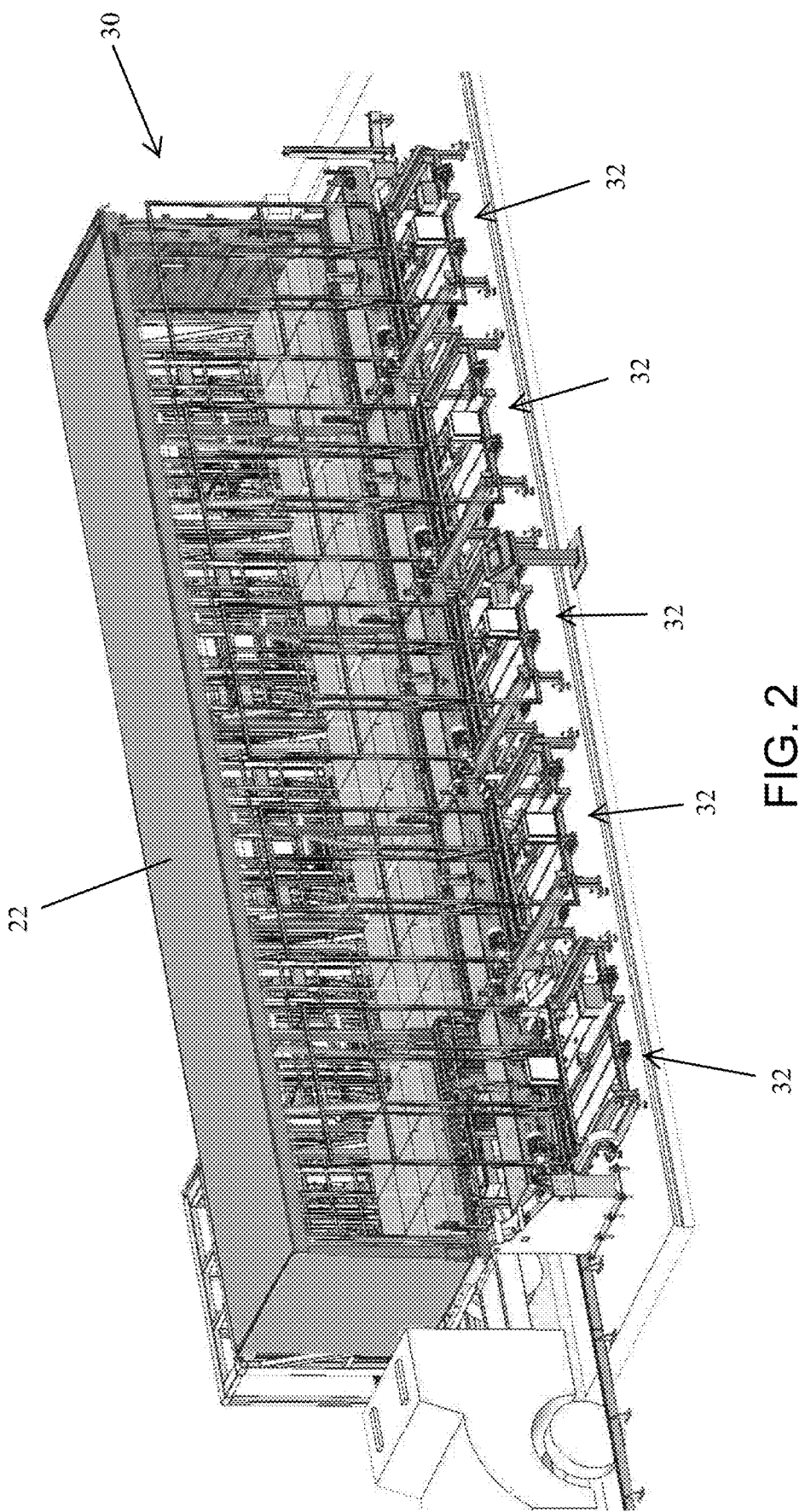
FIG. 2 is a perspective view of a poultry intake or receiving module of a poultry processing facility for unloading inbound poultry from a truck.
Figure 3:
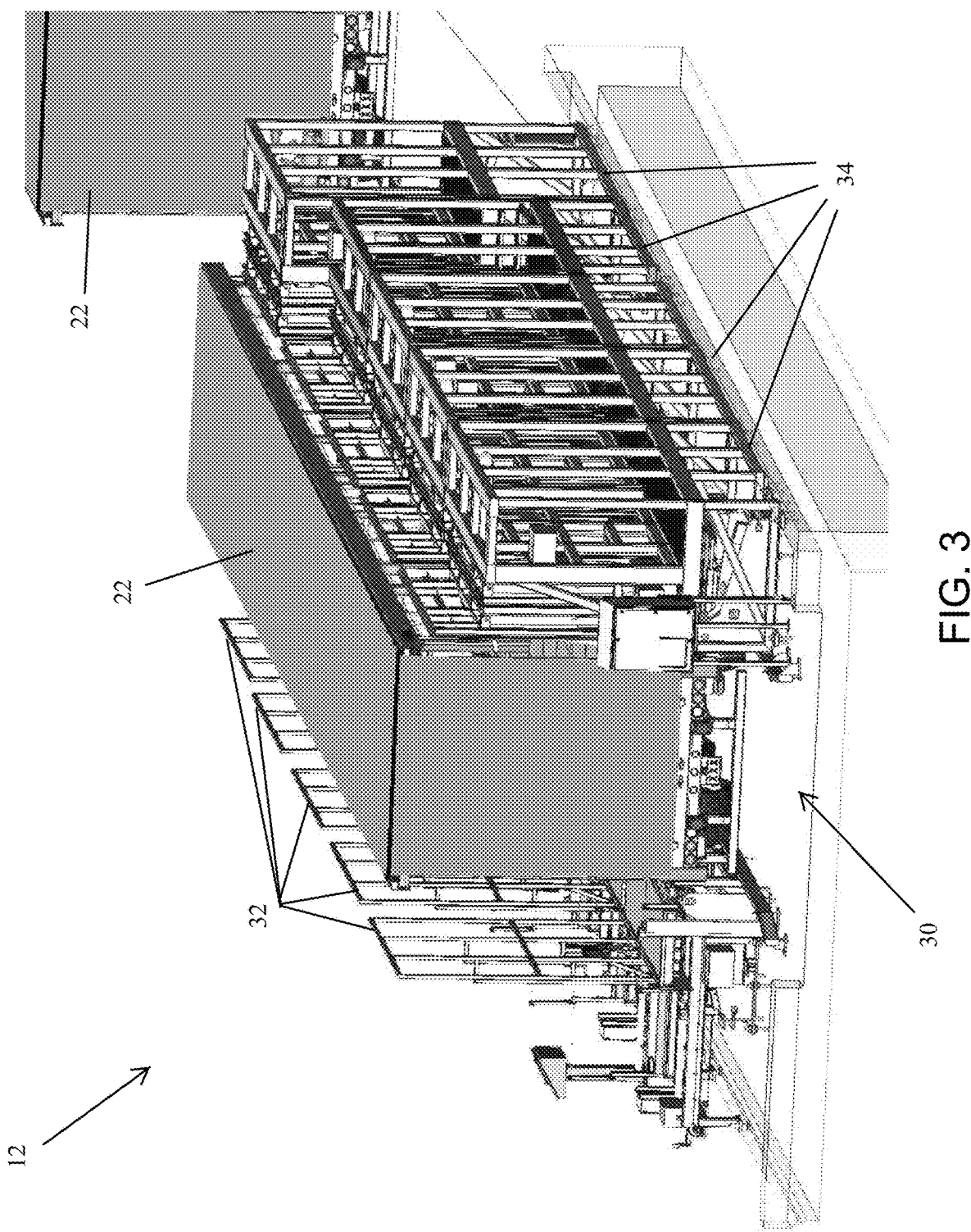
FIG. 3 is a generally opposite perspective view of the poultry intake or receiving module of FIG. 2, with a truck shown in the module.

Referring now to the drawings and the illustrative embodiments depicted therein, a poultry processing facility 10 includes an intake or receiving module 12, a receiving conveyor system 14, a poultry stunning chamber or system 16, a stunned poultry hanging area or retrieving module 18, and an empty crate or cage handling system 20, all in conveyable communication with one another, such as shown in FIGS. 1A and 1B. The poultry processing facility 10 receives live poultry that arrives to the facility on a poultry transport vehicle 22 and transports the live poultry in cages 24 to the poultry stunning system 16 to be irreversibly stunned, sedated or incapacitated such that the live poultry enter a passive state of unconsciousness, substantially without resistance or showing signs of stress or escape actions, thus reducing injuries and thereby improving the quality of poultry meat and byproducts harvested from the poultry animals. The stunning system 16 includes a controlled atmosphere stunning (CAS) system dispensing increasingly noxious concentrations of an asphyxiant gas, such as carbon dioxide, argon, or nitrogen, to expose the poultry inside the CAS to the gas (FIG. 1A). When the poultry first enter the CAS they willingly inhale the gas and as they are transported further through the CAS and as the concentration of asphyxiant gas increases, the poultry are increasingly incapacitated until becoming irreversibly incapacitated or stunned. The CAS is more fully described in commonly-owned U.S. patent application Ser. No. 16/163,057, filed on Oct. 17, 2018, and entitled "Poultry Stunning System and Method," which is hereby incorporated herein by reference in its entirety. Once irreversibly incapacitated or stunned, the stunned poultry are transported out of the stunning system 16 and to a poultry hanging station 18 (FIG. 1B) where operators or hangers retrieve the stunned poultry from the cage 24 and prepare the poultry to be transported to a slaughter or killing facility 26, such as by placing the animals onto a conveyor or shackle line that conveys the animals to the slaughter facility 26. The empty cages 24 are transported from the hanging module 18 via the empty cage handling system 20 to an empty transport vehicle 22 to be transported to a poultry farm where the cages 24 may be re-filled with poultry.

In one embodiment of the present invention, as illustrated in FIGS. 1A and 1B, the receiving module 12 receives a poultry transport vehicle 22, such as a semi-truck configured for transporting poultry cages 24. The receiving module 12 retrieves the cages 24 from the semi-truck and transfers them to the receiving conveyor system 14 to be conveyed to the poultry stunning system 16. The poultry stunning system 16 receives the cages 24 containing live poultry and transports the cages 24 through incrementally increasing concentrations of $CO_2$, or other noxious, asphyxiant, or other breathable non-oxygen gas, within the CAS to irreversibly stun the poultry without the poultry animals causing injury to themselves or the rest of the poultry in the same cage 24. The cages 24 of stunned poultry are transported from the stunning system 16 to the poultry hanging module 18 where operators retrieve the stunned poultry from the cages 24 and prepare the animals for slaughter, such as by shackling individual poultry animals onto a shackle line 28 that is connected to a slaughter facility 26. The empty cage handling system 20 receives the cages 24 after the stunned poultry have been removed at the poultry hanging module 18 and prepares the cages 24 to be stacked onto an empty, or partially empty, transport vehicle 22 to be returned to a poultry farm.

Figure 4:
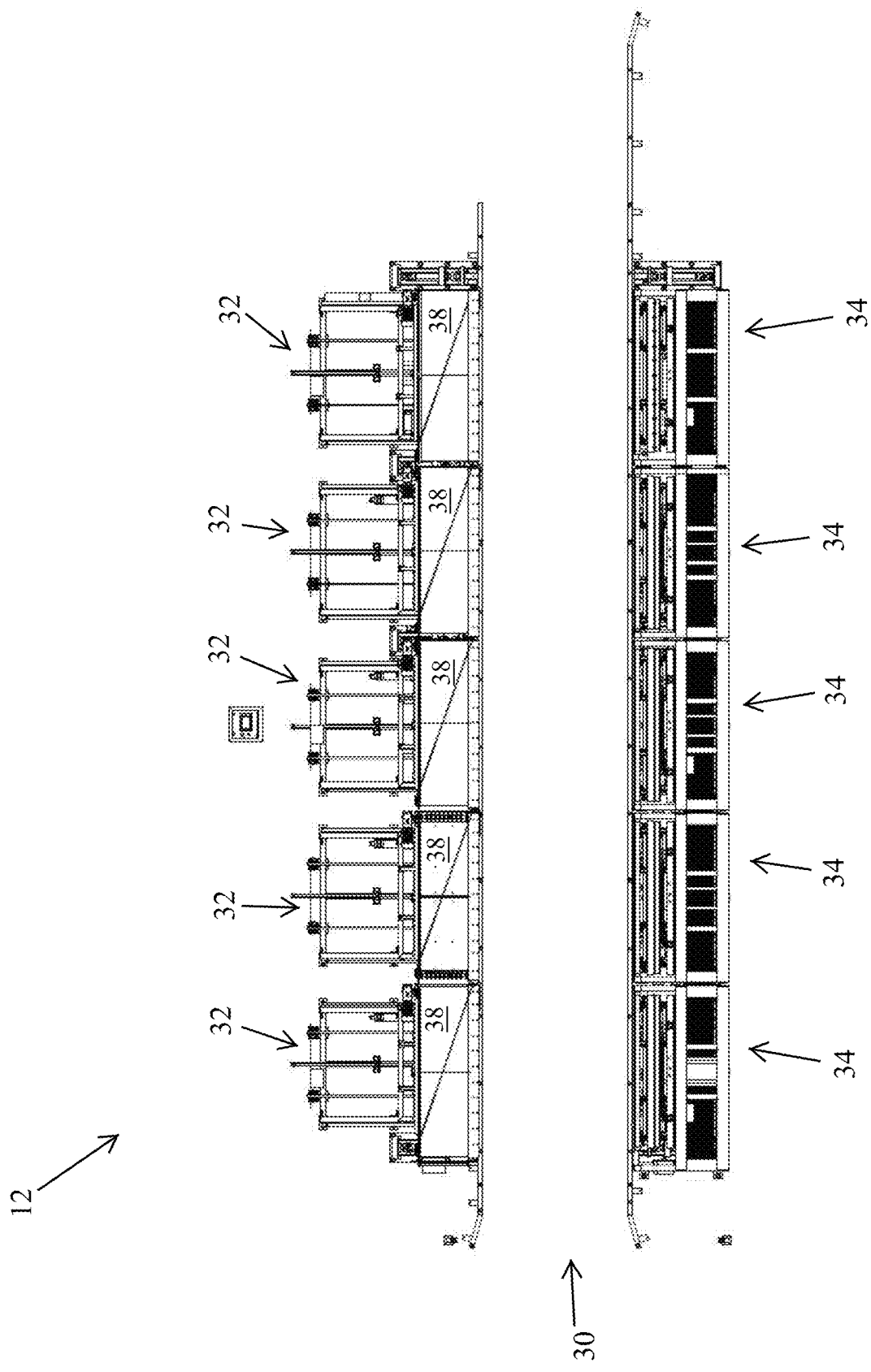
FIG. 4 is a top view of the poultry intake or receiving module of FIG. 2.
Figure 5:
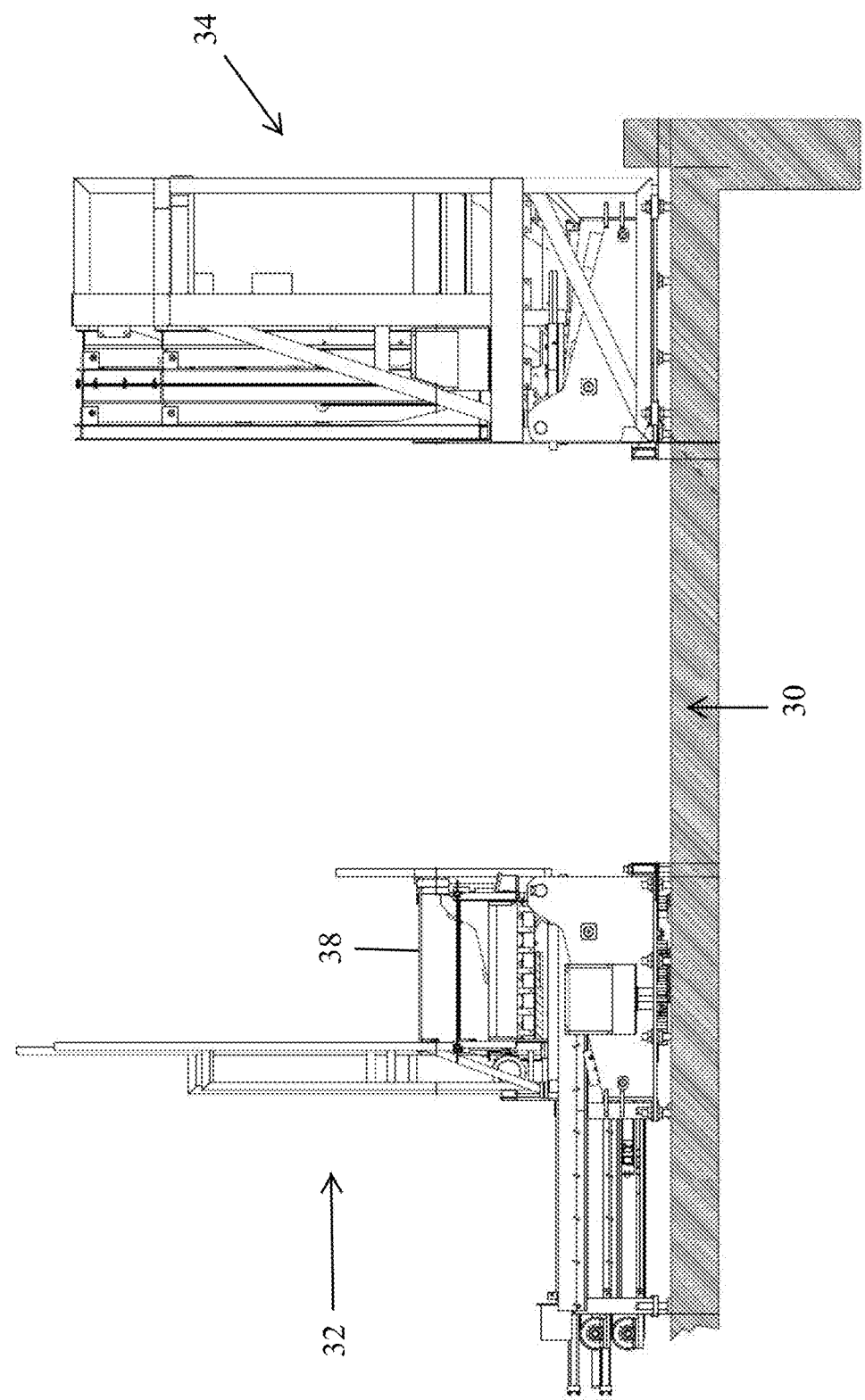
FIG. 5 is a rear elevation view of the poultry intake or receiving module of FIG. 2.

In the illustrated embodiment, as shown in FIGS. 2-5, the receiving module 12 includes a drive path or track 30 that receives the transport vehicle 22 as it enters the poultry processing facility 10. The vehicle driver drives the transport vehicle 22 into the facility 10 and through the drive track 30 until it is properly positioned inside of the receiving module 12. The receiving module 12 includes a plurality of shuttle conveyors 32 and a plurality of cage pushers 34 on opposing sides of the drive path 30 to unload the cages 24 from the transport vehicle 22 and onto the receiving conveyor system 14. As shown in FIGS. 2-5, the shuttle conveyors 32 are situated on the left or driver's side of the transport vehicle 22 as it enters the receiving module 12. The plurality of cage pushers 34 are situated on the right or passenger's side of the transport vehicle 22 as it enters the receiving module 12. The shuttle conveyors 32 include a shuttle actuation system 36 to slide or shuttle the conveyor 32 into a receiving position proximate the transport vehicle 22 and to return the shuttle conveyor 32 to a conveying position that is substantially in line with the conveying direction of the receiving conveyor system 14. When the shuttle conveyor 32 is in the receiving position it can receive a stack of cages 24 from the transport vehicle 22. A cage pusher 34 corresponding to a shuttle conveyor 32 opposite the cage pusher 34 pushes a stack of cages 24 from the right side of the transport vehicle 22 toward the corresponding shuttle conveyor 32. The shuttle conveyor 32 receives the pushed stack of cages 24 on a conveyor surface 38 (FIGS. 1A and 4). The shuttle conveyor 32 then shuttles from the receiving position to the conveying position where the shuttle conveyor 32 can convey the stack of cages 24 to the receiving conveyor system 14.

The shuttle conveyors 32 are configured to receive one width of stacked cages 24 from the transport vehicle 22. For example, cages 24 may be stacked three stacks wide on the transport vehicle 22. The shuttle conveyor 32 is sized to accept only one width of stacked cages 24, wherein the shuttle conveyor 32 conveying surface 38 is at least as wide as the width of one cage 24. The pushers 34 push one width or aisle of stacked cages 24 toward the corresponding shuttle conveyor 32 and stops after the one width of stacked cages 24 is substantially clear of the side of the transport vehicle and on the shuttle conveyor 32. Once the shuttle conveyor 32 receives the width of cages 24, the shuttle conveyor 32 slides from the receiving position to the conveying position. From the conveying position, the cages 24 are selectively conveyed with the corresponding shuttle conveyor 32, and subsequent shuttle conveyors 32, out of the receiving module 12 to the receiving conveyor system 14 (FIG. 1A). After the cage 24 has left the shuttle conveyor 32, the shuttle conveyor 32 can return to the receiving position to receive another width of stacked cages 24. The shuttle conveyors 32 and cage pushers 34 may coordinate to unload the forward-most cages from the transport vehicle 22 and to work backward to unload cages from the vehicle 22 until the vehicle 22 is empty. The receiving module 12 is adapted to only unload stacks of cages that include at least one poultry animal in at least one of the cages 24 of that stack or that aisle of stacks. The shuttling, pushing, receiving, and conveying processes are repeated until the transport vehicle 22 is empty or until the remaining stacks of cages 24 contain no poultry animals. Once the transport vehicle 22 is empty, the transport vehicle 22 is driven forward along the drive track 30 to an intermediate empty cage restacking position 40.

The shuttle conveyors 32 of the receiving module 12 coordinate to transfer cages 24 from the receiving module 12 to the receiving conveyor system 14. Receiving conveyor system 14 includes initial accumulators 42 to regulate the flow of cages 24 within the receiving conveyor system 14, a full stack height sensing system (not shown), a half-stack cage de-stacker 44 that de-stacks full stacks of cages 24 into half-stacks, an empty cage sensing and transfer station 46, an accumulator sorter 48 to direct half-stacks of cages 24 to a single cage de-stacker 50 that has available capacity to de-stack the half-stack of cages 24, and pre-stun accumulators to regulate the flow of cages 24 prior to the cages 24 entering the poultry stunning system 16.

Figure 6:
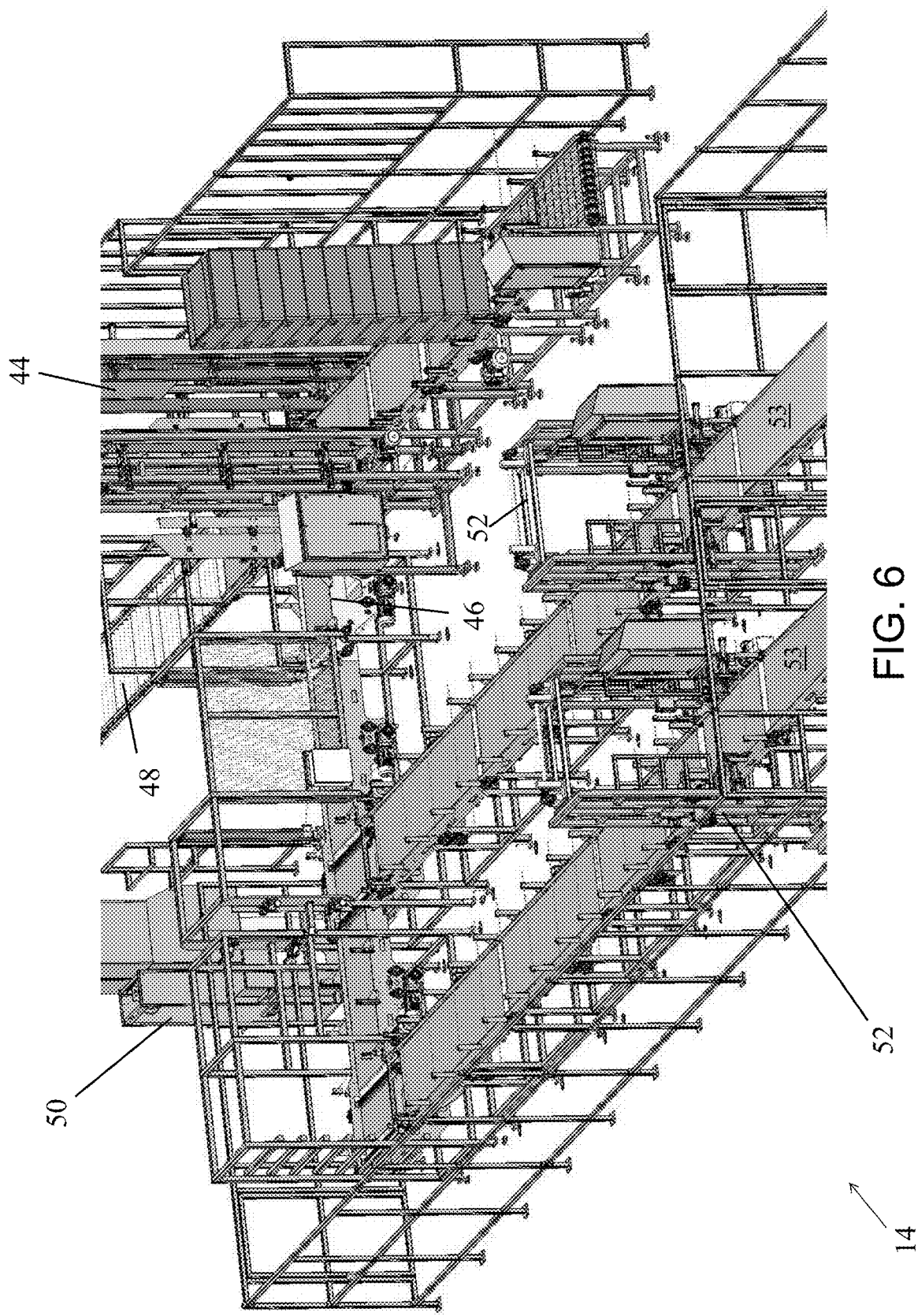
FIG. 6 is a perspective view of a receiving conveyor system of a poultry processing facility in accordance with the present invention.
Figure 7:
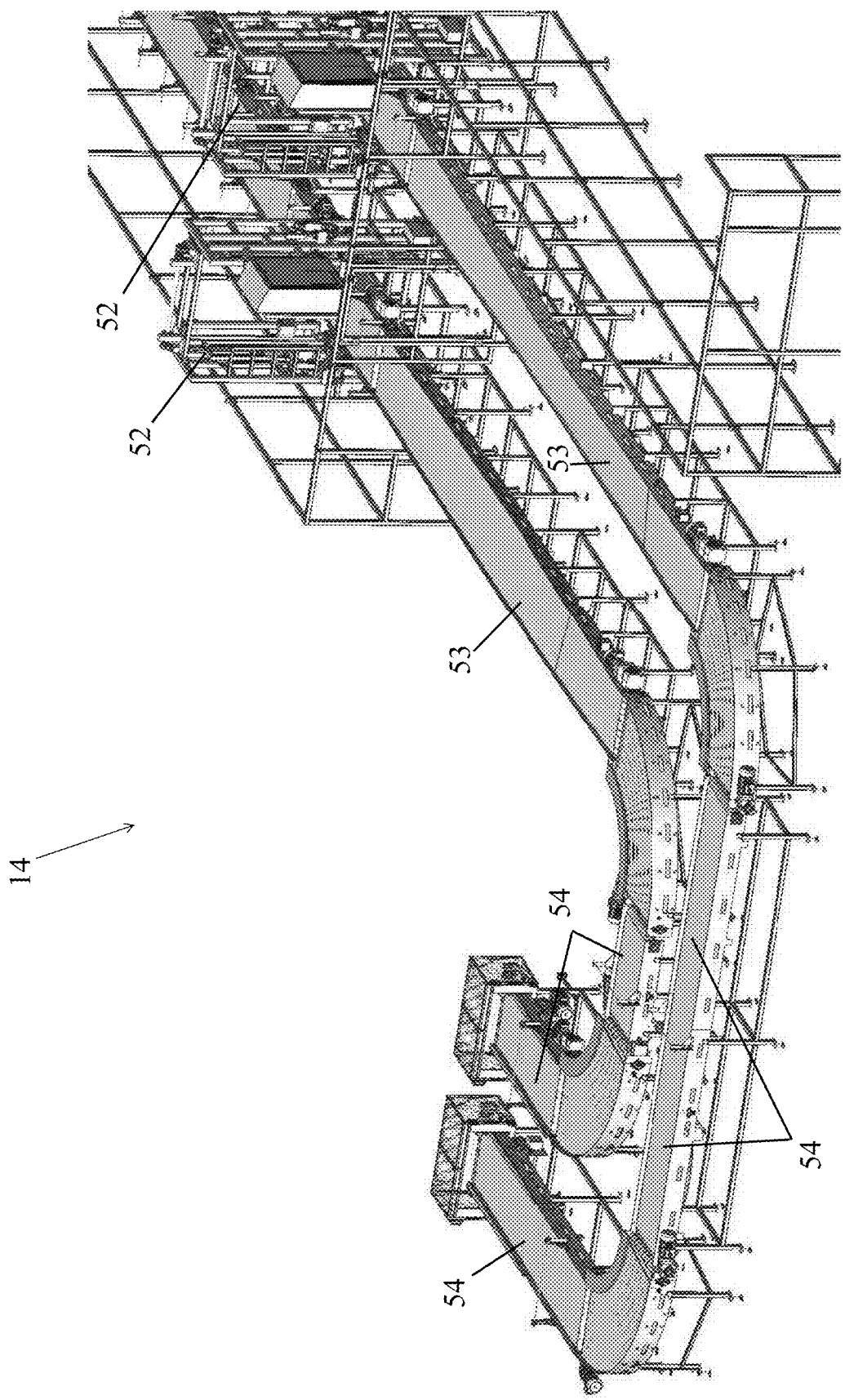
FIG. 7 is another perspective view of the receiving conveyor system of FIG. 6.
Figure 8:
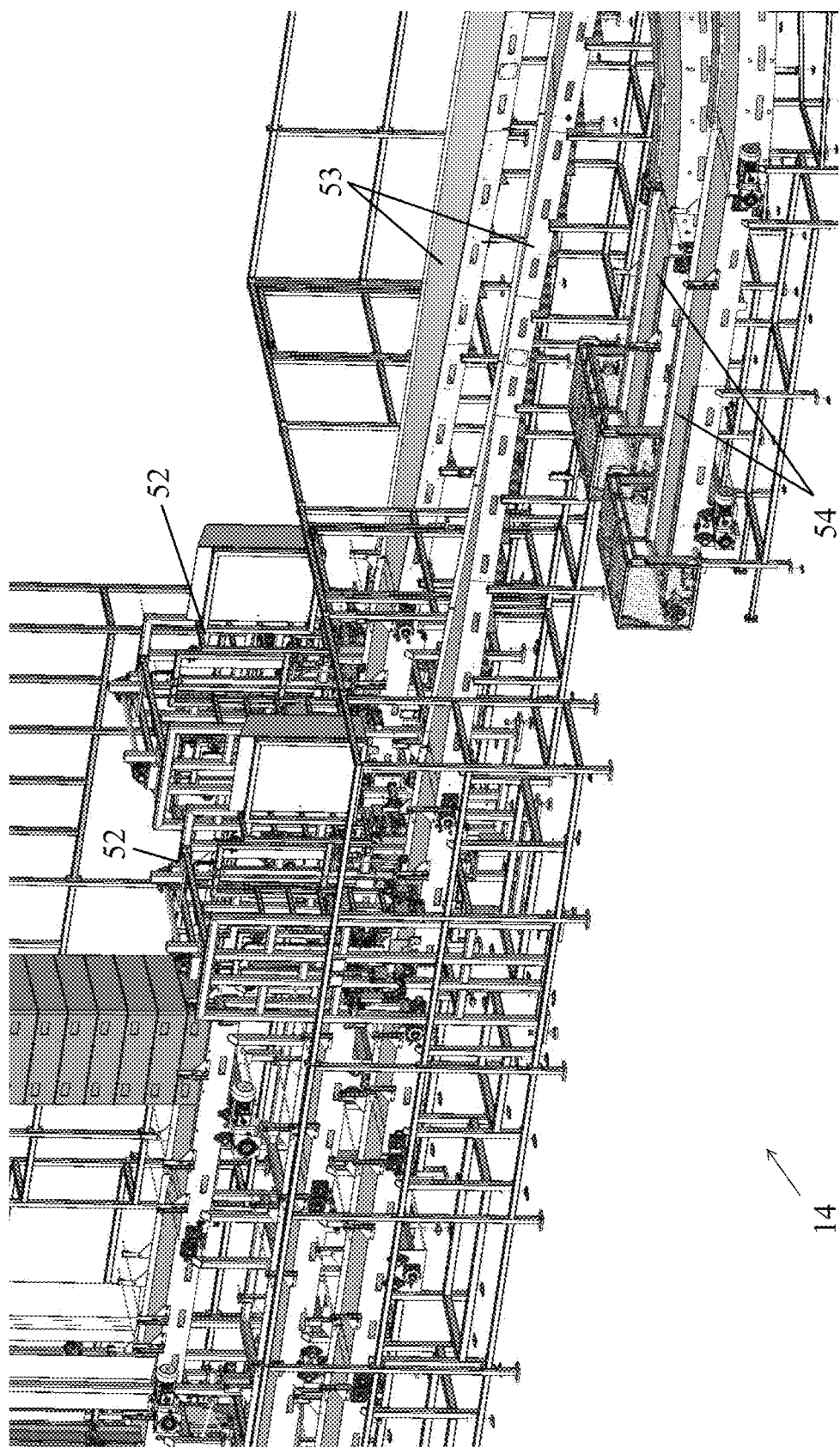
FIG. 8 is another perspective view of the receiving conveyor system of FIG. 6.

In the illustrated embodiment, as shown in FIGS. 6-8, stacks of cages 24 enter the receiving conveyor system 14 from the receiving module 12. Cages 24 are delivered on the transport vehicle 22 in stacks of either ten or twelve cages high, depending on the cages 24 location on the vehicle 22, and travel along the conveyor system 14 to a half-stack cage de-stacker 44. The full stack of cages 24 is analyzed by the full stack height sensing system to determine if the full stack includes ten or twelve cages 24. The full stack height sensing system may include a vision system (not shown) to determine the number of cages in the full stack. A full stack of ten cages 24 are de-stacked into five cage high half-stacks and a full stack of twelve cages 24 are de-stacked into six cage high half-stacks. The half-stacks of cages 24, five cages high or six cages high, continue to an empty cage sensing and transfer station 46. The sensing station 46 determines if the half-stack of cages 24 is empty (no poultry occupying the cages), and if the entire half-stack of cages 24 is empty, the transfer station 46 transports the empty half-stack of cages 24 to an intermediate transport vehicle loading conveyor 48 to transport the empty cages 24 to the transport vehicle 22 as it occupies the intermediate restacking position 40.

If the sensing and transfer station 46 determines that poultry are present in any of the cages 24 in the half-stack, the half-stack is transferred toward an accumulator sorter 50. Between the transfer station 46 and the sorter 50, an operator or inspector inspects the half-stacks of cages 24 to determine if any of the cages 24 in the half-stacks are empty. If a cage 24 is determined to be empty, the inspector can remove the empty cage 24 and place it on the intermediate transport vehicle loading conveyor 48 to be transported to and loaded onto the transport vehicle 22. The remaining cages 24 having live poultry continue to the accumulator sorter 50. The accumulator sorter 50 sorts and directs the remaining stacks of the half-stack to one or more single cage de-stackers 52. The accumulator sorter 48 may be configured to determine which single cage de-stacker 52 to direct the half-stack toward based on the flow of cages at the poultry stunning system 16. The single cage de-stacker 52 de-stacks the remaining cages 24 in the half-stacks to single cages 24 to be transported into the poultry stunning system 16.

As illustrated in FIGS. 1A and 6-8, after the cages 24 are de-stacked by the single cage de-stacker 52 they then travel along the receiving conveyor system 14 past an inspector or inspectors that count the number of poultry animals in each cage 24 and retrieve and remove any DOA poultry animals. The inspector inputs the number of live poultry animals per cage 24 into an operating system, where the operating system may determine a required amount of stunning time needed for that cage 24. Optionally, the receiving conveyor system 14 includes a tilted, sloped, or angled conveying surface 53 downstream of the single cage de-stacker 52 to provide the inspector with a view through the top of each cage 24 to better inspect the contents of the cage 24. The tilt, slope, or angle of the conveying surface may be set at ten degrees sloping downward toward the inspector, although other tilt angles are also possible. The receiving conveyor system 14 transports the single layered cages 24 toward the stunning system 16 to pre-stun accumulators 54 that regulate the flow of cages 24 into the CAS poultry stunning system 16.

Figure 9:
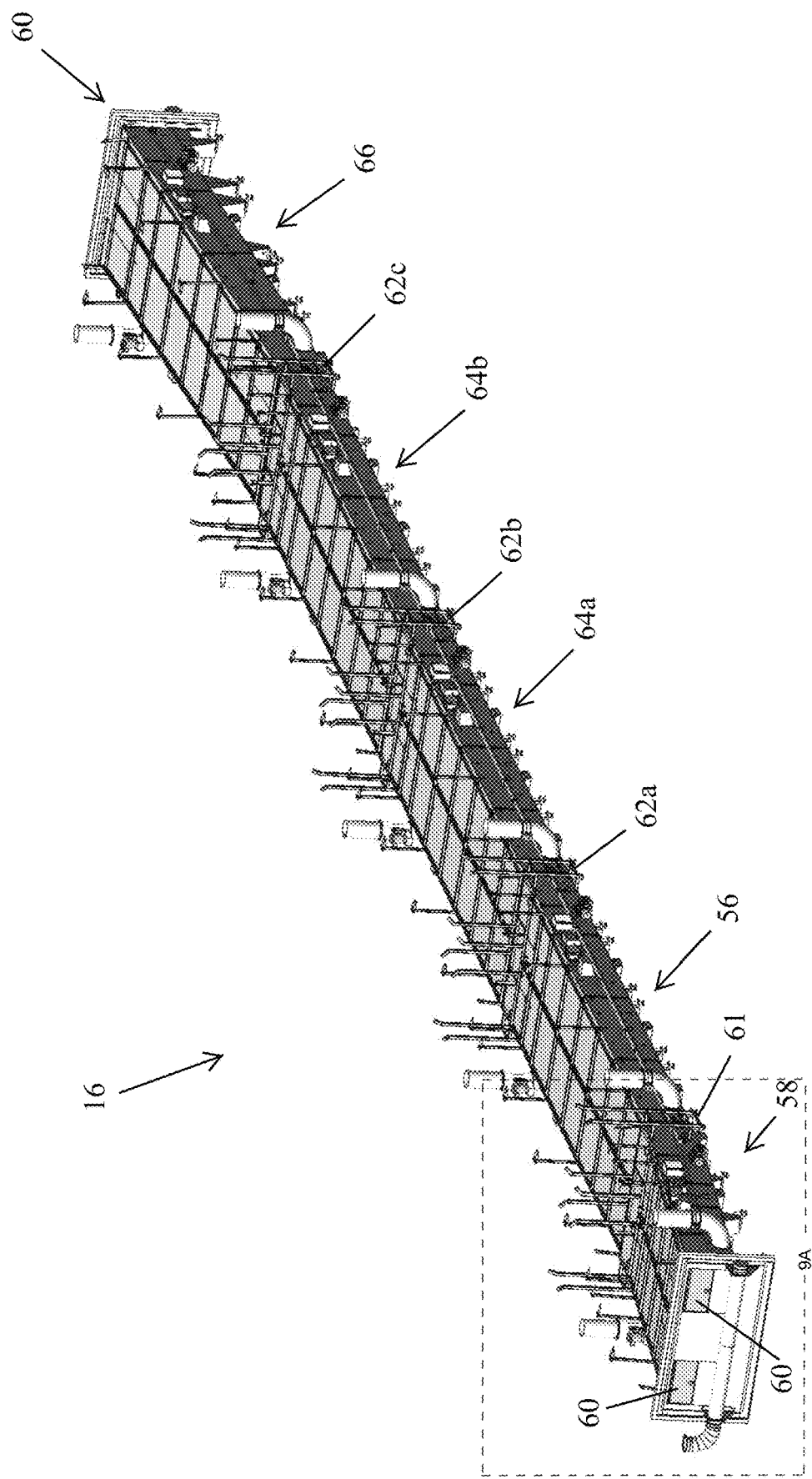
FIG. 9 is a top-side perspective view of a controlled-atmosphere-stunning (CAS) system in accordance with the present invention.
Figure 9A:
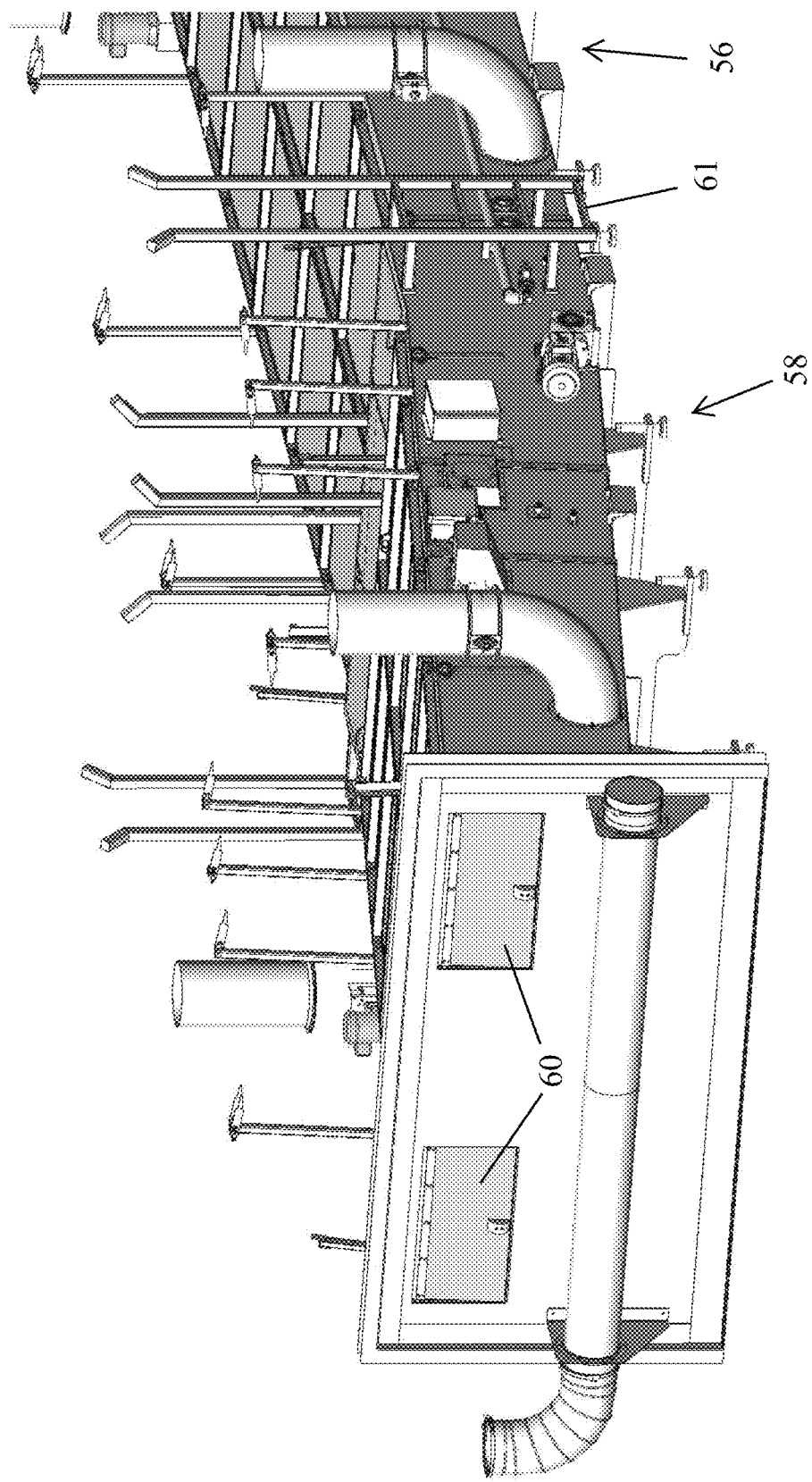
FIG. 9A is an enlarged view of the region designated 9A in FIG. 9.
Figure 10:
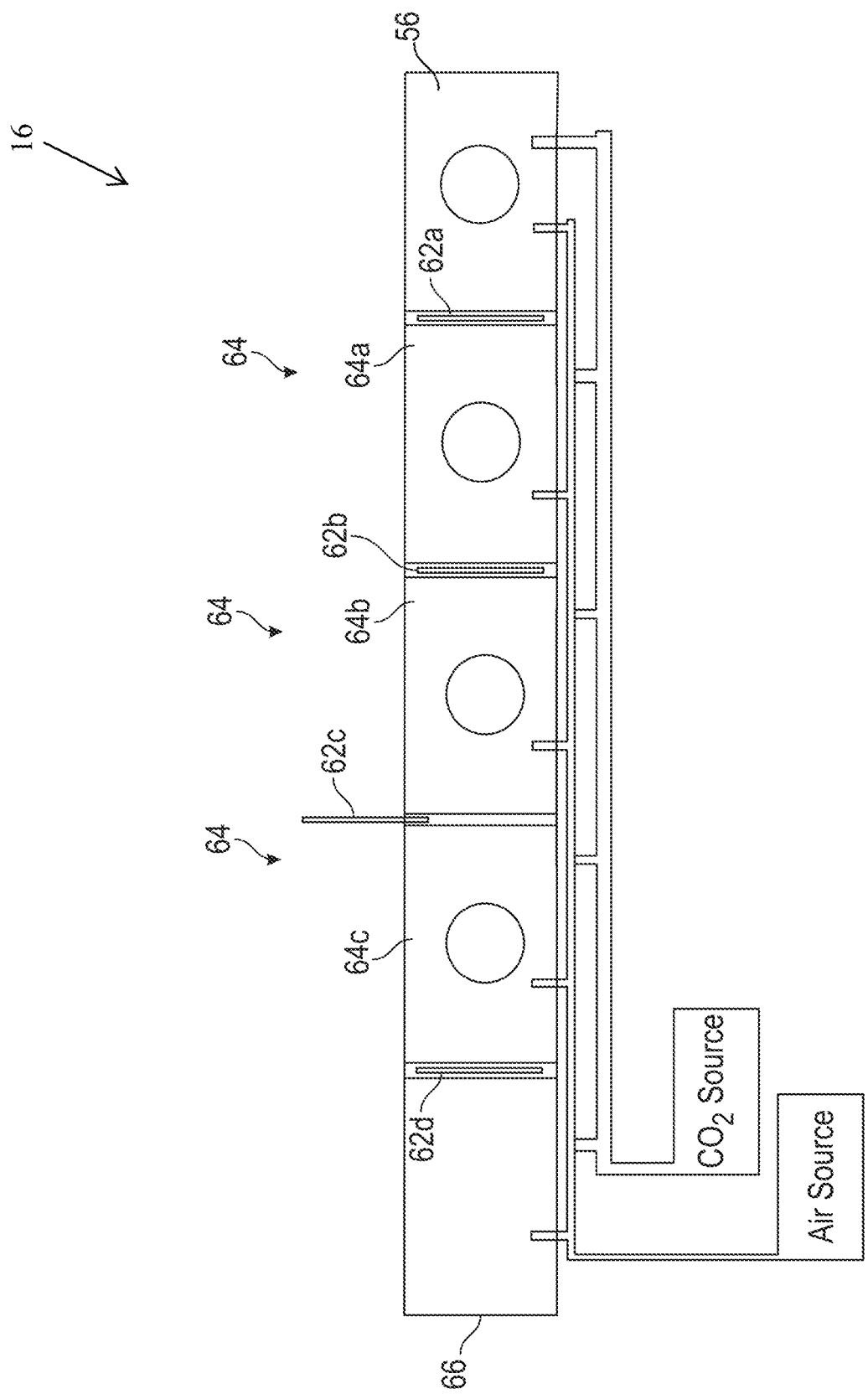
FIG. 10 is a diagrammatic side elevation of a poultry stunning system in accordance with the present invention.
Figure 11:
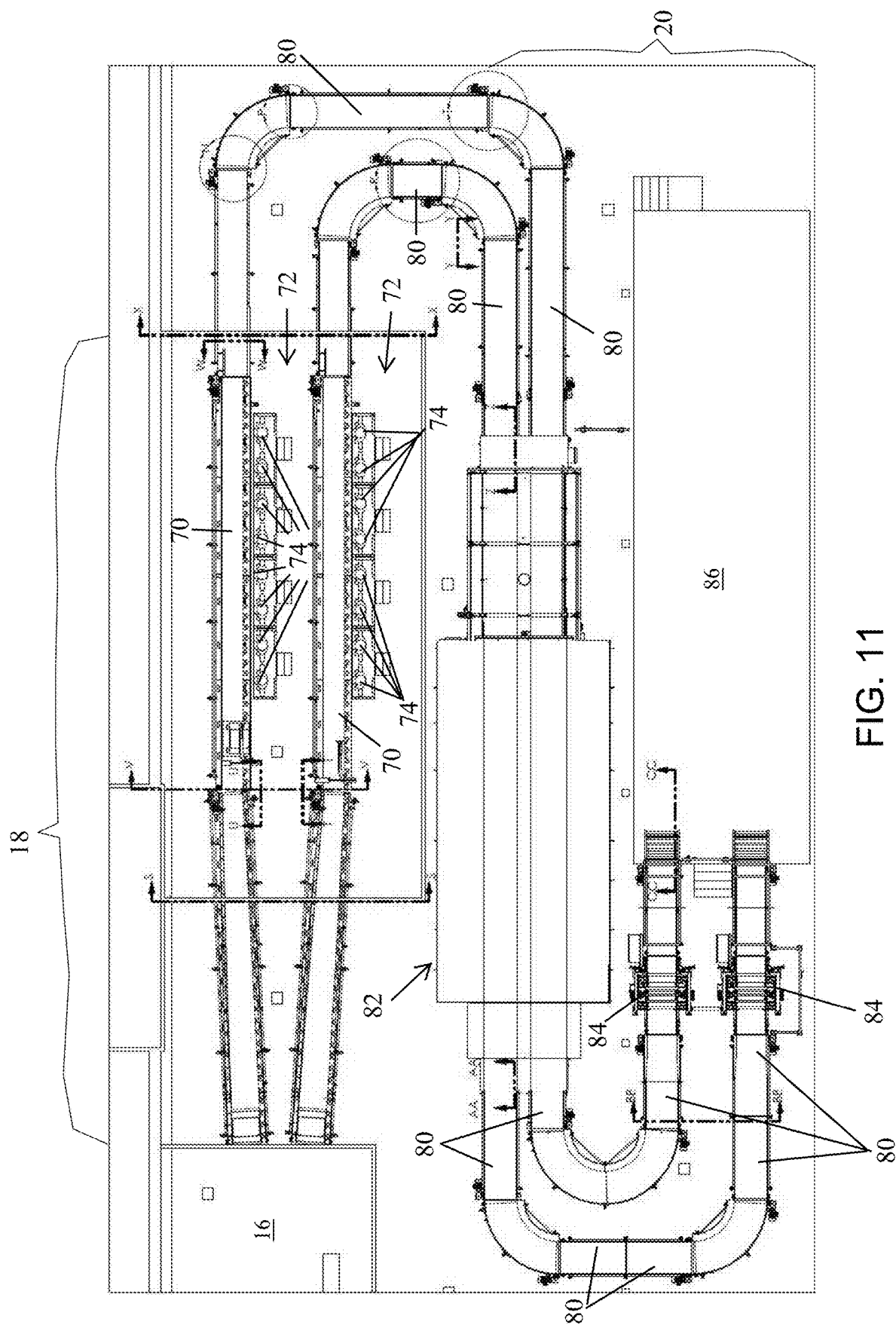
FIG. 11 is a top plan view of a stunned poultry retrieval and hanging module and an empty crate handling system in accordance with the present invention.

In the illustrated embodiment, as illustrated in FIGS. 1A, 1B, and 9-10, the poultry stunning system 16 includes an initial stun chamber 56 having a conveyor to accept cages 24 from an infeed tunnel 58 at the beginning of the stunning system 16. The infeed tunnel includes an open or openable upper entrance region 60 that is configured to receive live poultry (typically contained in a cage 24) from the receiving conveyor system 14 and transport it to the initial stun chamber 56 through an openable infeed tunnel discharge wall or panel 61. An initial openable side wall or panel 62a permits discharge of the cage 24 out of the initial stun chamber 56 and into a first intermediate stun chamber 64a. Subsequent intermediate openable side walls or panels 62b-c permit movement of the cage 24 from the first intermediate stun chamber 64a to a second intermediate stun chamber 64b, and finally to the final stun chamber 66. The final stun chamber 66 receives the cage 24 from the second intermediate stun chamber 64b via the most downstream intermediate openable side wall or panel 62c. The final stun chamber 66 has an open or openable upper discharge region 68 that permits the cage 24 to be discharged to the stunned poultry hanging or retrieving module 18 (FIG. 9). As illustrated in FIGS. 9 and 10, additional intermediate stun chambers 64 and additional openable side walls or panels 62 may be included with the stunning system 16, such as intermediate stun chamber 64d and openable side wall or panel 62d to provide additional stunning chambers for additional concentrations of gas as required to sufficiently stun the poultry prior to slaughter. An exemplary poultry stunning system 16 is described in commonly assigned U.S. patent application Ser. No. 16/163,057, filed on Oct. 17, 2018, and entitled "Poultry Stunning System and Method," which is hereby incorporated herein by reference in its entirety.

The initial stun chamber 56, the intermediate stun chambers 64, and the final stun chamber 66 are individually regulated to contain respective intermediate concentrations of asphyxiant gas relative to the other stun chambers of the poultry stunning system 16. The initial stun chamber contains an initial elevated asphyxiant gas concentration, which is then preferably followed by increasingly higher gas concentrations in each subsequent stun chamber.

In the illustrated embodiment, as shown in FIGS. 1A-1B and 11-13, the stunned poultry hanging or retrieving module 18 receives cages 24 from the upper discharge region 68 of the poultry stunning system 16 and transports the cages 24 of stunned poultry on a retrieving conveyor 70. The retrieving conveyor 70 transports the cages 24 to a hanging area 72 where poultry retrieval and hanging operators or hangers 74 retrieve the stunned poultry animals from the cages 24. Hangers 74 retrieve individual poultry animals from the cage 24 and transfer the stunned animal to a slaughter transport apparatus to transfer the stunned animal to a slaughter or kill facility 26. The slaughter transport apparatus may include an overhead cable conveyor or shackle line 76 including stunned poultry receiving elements 78, typically shackles or hooks, to secure a poultry animal to the shackle line 76. The shackle line 76 reduces the space required for the hanging area 72 and allows the hanger 74 to retrieve the stunned animals from the cages 24 on the retrieving conveyor 70 and hang the animal on the shackle line 76 without substantial physical position change.

Figure 12A:
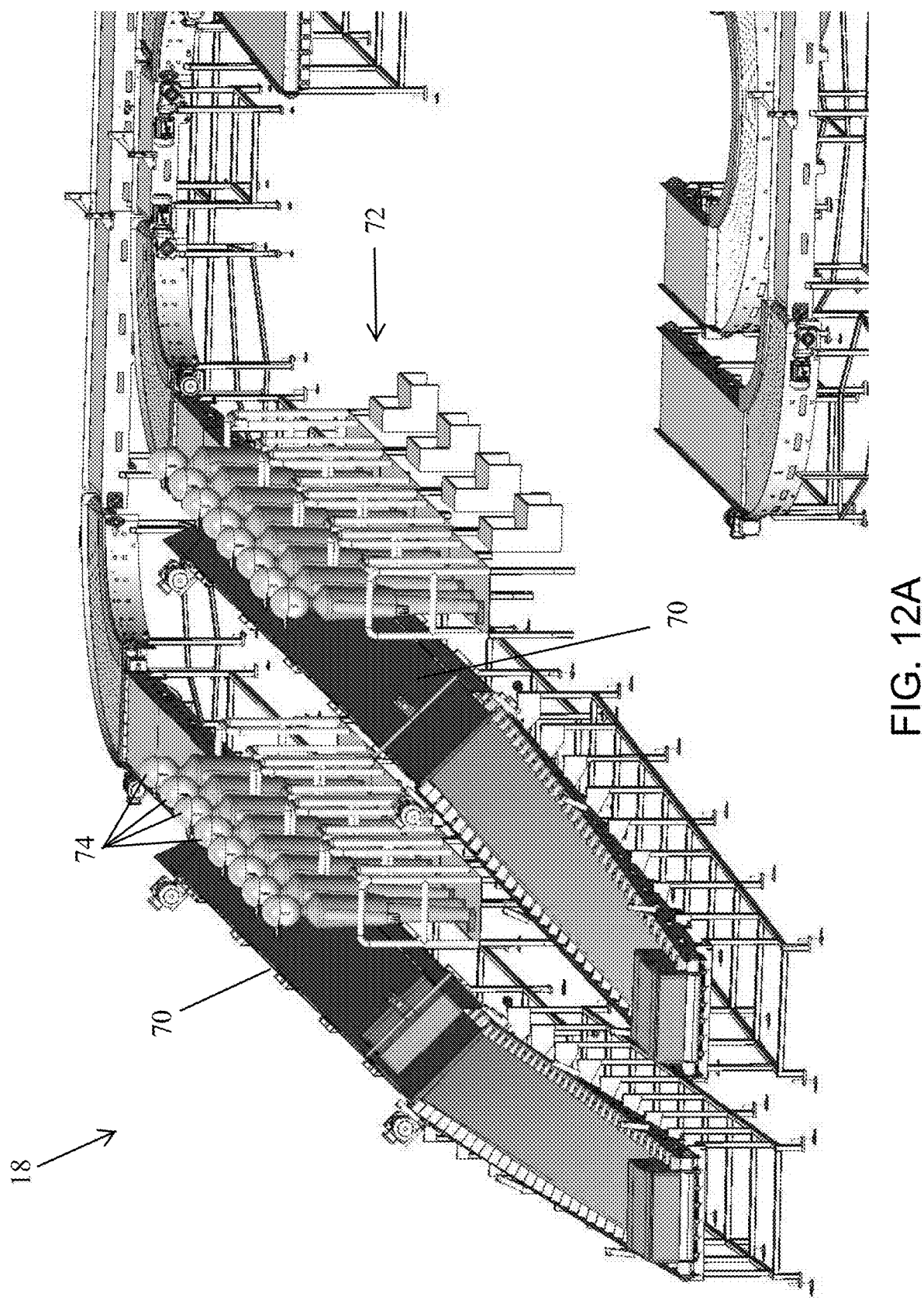
FIGS. 12A-12B are perspective views of a stunned poultry picking module in accordance with the present invention.
Figure 12B:
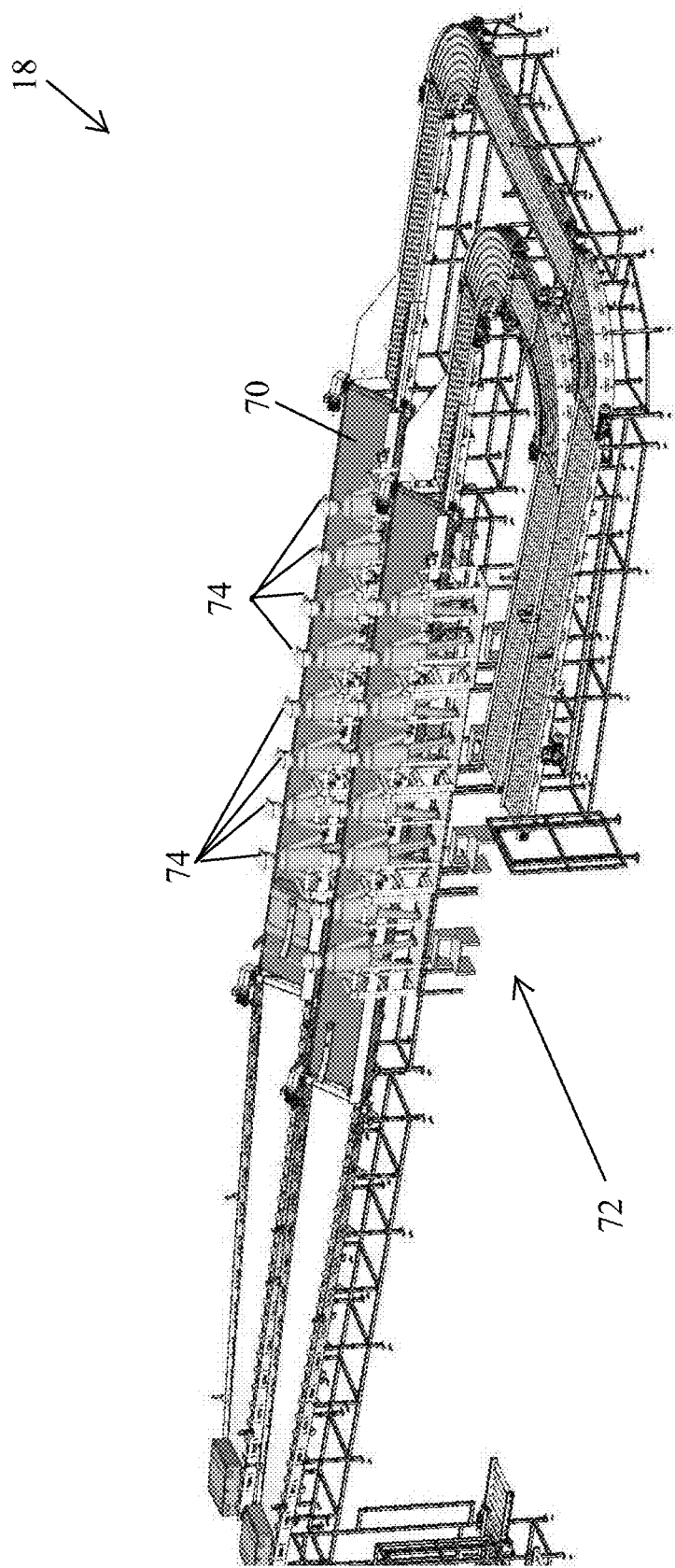
Figure 13:
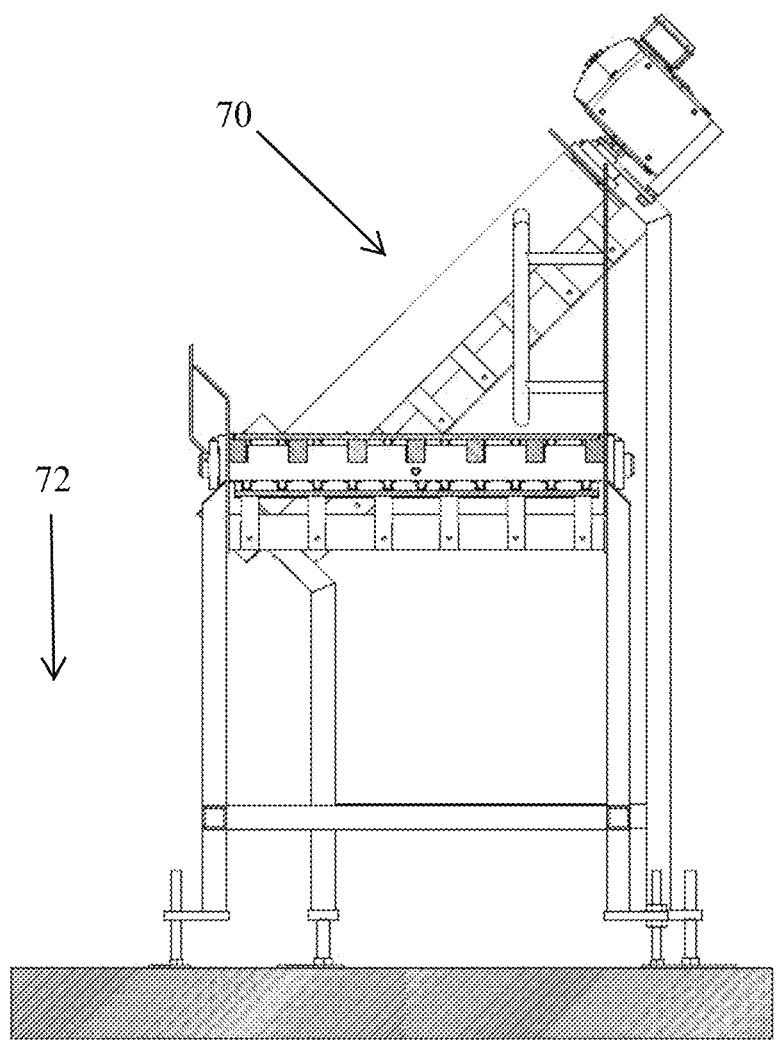
FIG. 13 is an elevation view of a tilted conveyor of the stunned poultry retrieval and hanging module of FIGS. 12A-12B.
Figure 14:
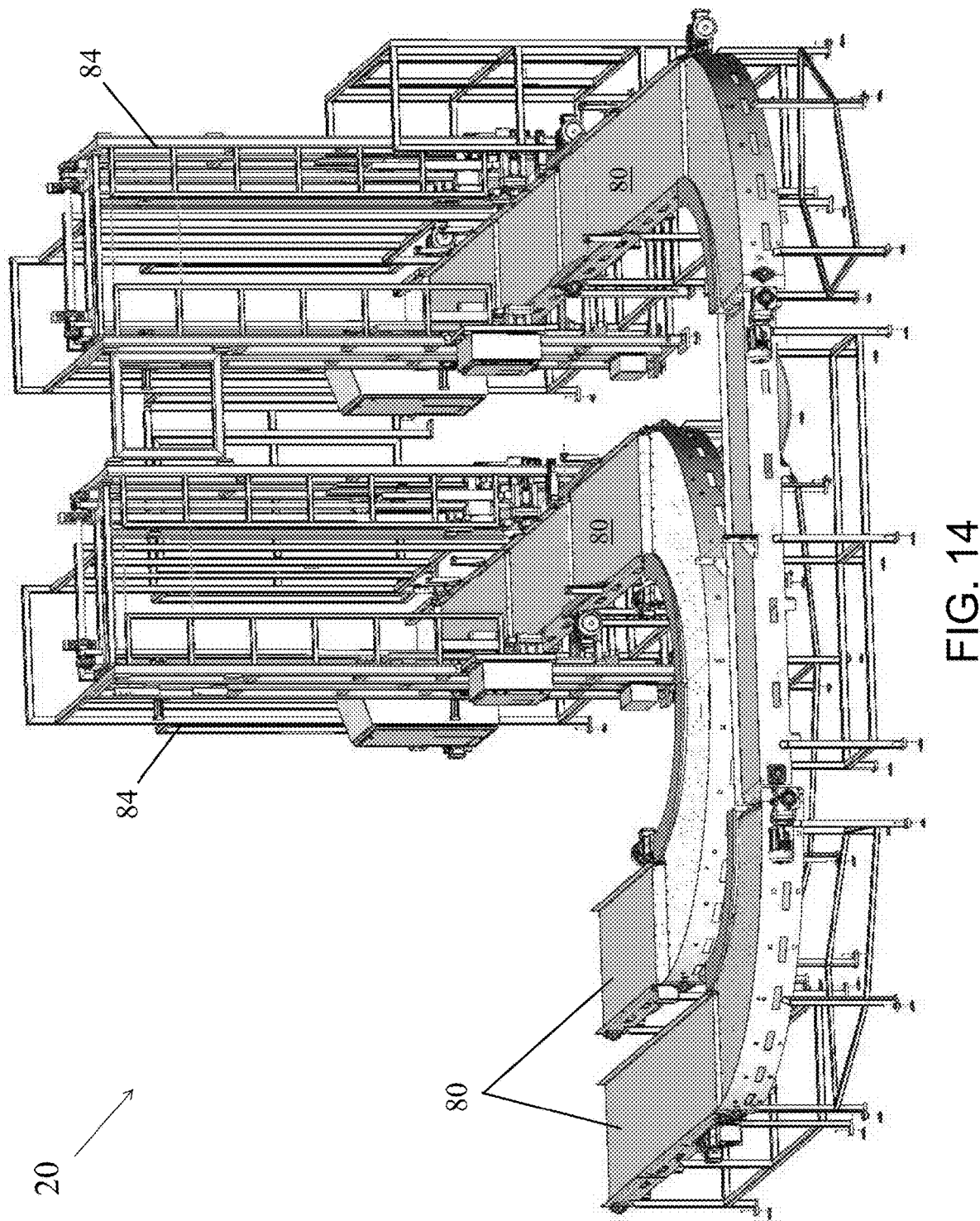
FIG. 14 is a perspective view of crate stackers of an empty crate handling system in accordance with the present invention.

In the illustrated embodiment of FIGS. 12A-13, the retrieving conveyor 70 includes a tilted, angled, or sloped conveying surface to aid poultry hanging operators or hangers 74 in removing the stunned poultry animals from their cages. The tilt, slope, or angle of the conveying surface may be set at forty-five degrees sloping downward toward the hangers 74. Providing a slope on the retrieving conveyor 70 aids in retrieving poultry animals from the cage 24 as the slope causes the poultry to slide or fall down the cage toward the low side of the cage 24 when on the retrieving conveyor 70, toward the hanger 74.

After all poultry animals are removed from the cages 24 at the hanging area 72, the empty cage is transported out of the poultry hanging module 18 to the empty cage handling system 20. In the illustrated embodiment of FIG. 11, the empty cage handling system 20 includes accumulators 80, a cage wash station 82, and cage stackers 84 along a conveyor system. Accumulators 80 are spaced along the conveyor path of the empty cage handling system 20 to regulate the flow of empty cages within the system 20. The empty cage handling system 20 transports the empty cages 24 to a final loading zone 86 where the cages 24 are loaded onto a transport vehicle 22 to be transported out of the poultry processing facility 10.

The cage washing system 82, which may be an automated or partially automated system, cleans the empty cages 24 prior to stacking and loading onto the transport vehicle 22. After exiting the cage washer 82, the empty cages are transported to a cage stacker 84. The cage stacker 84 stacks single cages 24 into stacks of cages, for example, stacks of ten or twelve cages high. The stacked cages 24 are transported to the end of the empty cage handling system 20 and into the final loading zone 86. The stacks of cages 24 are then loaded onto an empty or partially empty transport vehicle 22 to be transported out of the poultry processing facility.

In one embodiment, the receiving module 12 includes a leveling system (not shown) configured to adjust the elevation of a cage transport surface of the vehicle 22 to an unloading height proximate the shuttle conveyors 32 such that live poultry in the pushed cages 24 are not injured or damaged during transfer from the transport vehicle 22 to the shuttle conveyors 32. The leveling system may include a leveling or flattening system to substantially remove or flatten any bowing, curvature, or camber of the cage transport surface of the transport vehicle 22. For example a middle portion of the leveling system may engage the transport vehicle's frame at a midsection thereof, to prevent the midsection from rising, and then opposite end portions of the leveling system can raise the forward and rearward ends of the transport vehicle to flatten or remove any bowing of the cage transport surface. Optionally, the receiving module 12 includes a leveling system (not shown) to adjust the elevation of each shuttle conveyor 32 to a receiving height proximate the transport vehicle 22 such that live poultry in the pushed cages 24 are not injured or damaged during transfer from the transport vehicle 22 to the shuttle conveyor 32.

The receiving module 12 may include laser alignment aids (not shown) to direct and aid drivers of the transport vehicle 22 to properly align the transport vehicle 22 within the drive path 30 of the receiving module 12. The receiving module 12 may include light curtains or safety warning lights (not shown) to alert individuals within the receiving module 12 to stand clear of moving parts, such as the shuttle conveyors 32 and the pushers 34.

Figure 15:
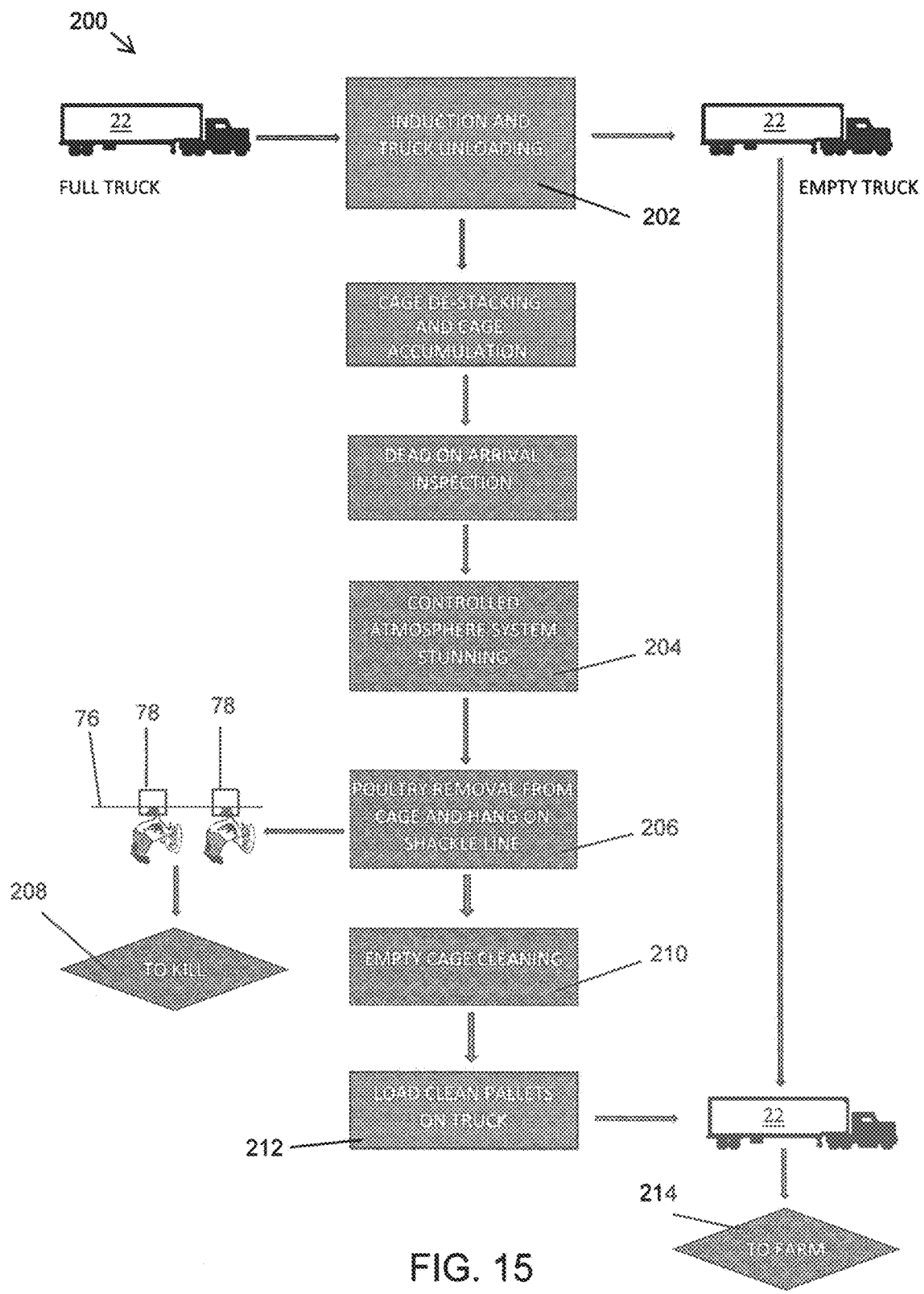
FIG. 15 is a flowchart depicting a method for poultry processing and operating a poultry processing facility including a controlled-atmosphere-stunning (CAS) system in accordance with the present invention.

In the illustrated embodiment of FIG. 15, a method 200 of processing poultry for slaughter in a poultry processing facility includes receiving 202 a transport vehicle 22 in a receiving module 12 and unloading 202 cages 24 of live poultry from the transport vehicle 22 in the receiving module 12. Next, the cages 24 containing live poultry are conveyed from the receiving module 12 to a poultry stunning system 16 and irreversibly stunned 204 in the conveyed cages 24 inside the poultry stunning system 16. Then, the cages 24 of stunned poultry are conveyed from the poultry stunning system 16 to a stunned poultry retrieving or hanging station 18. Next, stunned poultry animals are retrieved 206 from the conveyed cages 24 at a poultry hanging area 72 of the stunned poultry hanging station 18 and the retrieved stunned poultry animals are transferred 208 to a slaughter facility 26 for further processing. Empty cages 24 are then conveyed from the stunned poultry hanging station 18 for cleaning 210, and then to a final loading area 86 where the empty cages 24 are loaded 212 on an at least partially empty transport vehicle 22. Finally, the empty cages are transported 214 out of the poultry processing facility 10.

Accordingly, the present invention provides a system and method for processing live poultry in a poultry processing facility, including receiving and intaking live poultry, processing and inspecting the received poultry prior to transport through a humane and efficient poultry stunning system, passing the live poultry through the poultry stunning system, after which the stunned poultry are retrieved from their cages by operators and placed on a conveyor to be transferred to a slaughtering facility for subsequent processing. The system includes an empty cage handling system to clean and stack the empty cages after the stunned poultry have been removed. The cleaned and stacked cages are stacked onto a transport vehicle to be transported out of the poultry processing facility. The system includes induction conveyors to receive cages of live poultry from a transport vehicle, cage de-stackers, and conveyor accumulators to regulate the flow of cages through the system. Inside the humane and efficient poultry stunning system, live poultry animals willingly breathe in the gas having elevated levels of $CO_2$ or other breathable non-oxygen gas, and eventually lose consciousness, without showing obvious signs of stress or resistance during the process. By elevating the levels of $CO_2$ or other breathable non-oxygen gas in subsequent chambers, the poultry animals can be rendered unconscious to an irreversible stun condition, and readied for further processing.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A poultry processing system comprising:
   a receiving module for receiving and unloading a poultry transport vehicle and defining a transport vehicle drive path;
   a poultry stunning system for irreversibly stunning poultry;
   a stunned poultry hanging station configured for retrieval and processing of stunned poultry for transfer to a slaughter facility;
   a conveyor system configured to convey poultry from said receiving module to said poultry stunning system to said poultry hanging station;
   a plurality of poultry cage pushing apparatuses disposed on one side of said drive path; and
   a plurality of shuttle conveyors disposed on an opposite side of said drive path and configured to (i) receive poultry cages pushed by said poultry cage pushing apparatuses and (ii) convey the received poultry cages from said receiving module toward said poultry stunning system.

2. The poultry processing system of claim 1, wherein said shuttle conveyors are disposed along a track that is substantially perpendicular to said drive path, such that said shuttle conveyors can move along said track between a conveying position away from said drive path and a receiving position adjacent to said drive path.

3. The poultry processing system of claim 1, wherein each of said poultry cage pushers is operable to push a single width of at least one stack of poultry cages onto a corresponding one of said plurality of shuttle conveyors.

4. The poultry processing system of claim 1, wherein said receiving module further comprises a leveling system configured to adjust the elevation of the transport vehicle to an unloading height proximate said plurality of shuttle conveyors such that live poultry in the pushed cages are not injured or damaged during transfer from the transport vehicle to said shuttle conveyors.

5. A poultry processing system comprising:
   a receiving module for receiving and unloading a poultry transport vehicle;
   a poultry stunning system for irreversibly stunning poultry;
   a stunned poultry hanging station configured for retrieval and processing of stunned poultry for transfer to a slaughter facility; and
   a conveyor system configured to convey poultry from said receiving module to said poultry stunning system to said poultry hanging station;
   wherein said stunned poultry hanging station comprises a hanging area for retrieving stunned poultry animals from their respective cage and transferring the stunned poultry animal to the slaughter facility for further processing.

6. The poultry processing system of claim 5, wherein said receiving module defines a transport vehicle drive path, said system further comprising a plurality of poultry cage pushing apparatuses disposed on one side of said drive path and a plurality of shuttle conveyors disposed on an opposite side of said drive path, said shuttle conveyors configured to receive poultry cages pushed by said poultry cage pushing apparatuses and to convey the received poultry cages from said receiving module toward said poultry stunning system.

7. The poultry processing system of claim 5, further comprising a sloped conveyor angled downward toward said hanging area and configured so that gravity causes the stunned poultry to move along said sloped conveyor toward said hanging area.

8. A poultry processing system comprising:
   a receiving module for receiving and unloading a poultry transport vehicle;
   a poultry stunning system for irreversibly stunning poultry;
   a stunned poultry hanging station configured for retrieval and processing of stunned poultry for transfer to a slaughter facility;
   a conveyor system configured to convey poultry from said receiving module to said poultry stunning system to said poultry hanging station; and
   an empty poultry cage handling system adapted to transport empty poultry cages from said stunned poultry hanging station to a loading zone from which the empty cages are loaded on a transport vehicle, said empty poultry cage handling system comprising a cage washing system configured to clean the empty cages and a cage stacking system configured to stack the clean empty cages.

9. A poultry processing system comprising:
   a receiving module for receiving and unloading a poultry transport vehicle;
   a poultry stunning system for irreversibly stunning poultry;
   a stunned poultry hanging station configured for retrieval and processing of stunned poultry for transfer to a slaughter facility;
   a conveyor system configured to convey poultry from said receiving module to said poultry stunning system to said poultry hanging station; and
   a cage de-stacker to de-stack stacks of poultry cages.

10. A poultry processing system comprising:
    a receiving module for receiving and unloading a poultry transport vehicle;
    a poultry stunning system for irreversibly stunning poultry;
    a stunned poultry hanging station configured for retrieval and processing of stunned poultry for transfer to a slaughter facility;
    a conveyor system configured to convey poultry from said receiving module to said poultry stunning system to said poultry hanging station; and
    a conveyor accumulator adapted to regulate the flow of poultry cages in the poultry processing facility.

11. A poultry processing system comprising:
    a receiving module for receiving and unloading a poultry transport vehicle;
    a poultry stunning system for irreversibly stunning poultry;
    a stunned poultry hanging station configured for retrieval and processing of stunned poultry for transfer to a slaughter facility; and
    a conveyor system configured to convey poultry from said receiving module to said poultry stunning system, and from said poultry stunning system to said poultry hanging station;
    wherein said receiving module defines a transport vehicle drive path and comprises:
      a plurality of poultry cage pushing apparatuses disposed on one side of said drive path; and
      a plurality of shuttle conveyors disposed on an opposite side of said drive path;
      wherein said shuttle conveyors are configured to receive poultry cages pushed by said poultry cage pushing apparatuses and to convey the received poultry cages from said receiving module toward said poultry stunning system; and wherein said stunned poultry hanging station comprises a hanging area for retrieving stunned poultry animals from the poultry cages and transferring the stunned poultry animals to a slaughter facility for further processing.

12. The poultry processing system of claim 11, wherein said shuttle conveyors are disposed along a track that is substantially perpendicular to said drive path, such that said shuttle conveyors can move along said track between a conveying position away from said drive path and a receiving position adjacent to said drive path.

13. The poultry processing system of claim 11, wherein each of said poultry cage pushers is operable to push a single width of at least one stack of poultry cages onto a corresponding one of said shuttle conveyors.

14. The poultry processing system of claim 11, further comprising a sloped conveyor angled downward toward said hanging area and configured so that gravity causes the stunned poultry to move along said sloped conveyor toward said hanging area.

15. The poultry processing system of claim 11, further comprising an empty poultry cage handling system adapted to transport empty poultry cages from said stunned poultry hanging station to a loading zone from which the empty cages are loaded on a transport vehicle, said empty poultry cage handling system comprising a cage washing system configured to clean the empty cages and a cage stacking system configured to stack the clean empty cages.

16. The poultry processing system of claim 11, wherein said conveyor system further comprises a plurality of conveyor accumulators adapted to regulate the flow of poultry cages in the poultry processing facility.

17. A method of processing poultry for slaughter in a poultry processing facility, said method comprising:
receiving a transport vehicle in a receiving module that defines a transport vehicle drive path;
unloading cages of live poultry from the transport vehicle in the receiving module onto a plurality of shuttle conveyors disposed on one side of said drive path, using a plurality of poultry cage pushing apparatuses disposed on an opposite side of the drive path;
conveying the cages of live poultry from the receiving module to a poultry stunning system on the plurality of shuttle conveyors;
irreversibly stunning the live poultry animals in the conveyed cages inside the poultry stunning system;
conveying the cages of stunned poultry from the poultry stunning system to a stunned poultry hanging station;
retrieving stunned poultry animals from the conveyed cages at a poultry hanging area of the stunned poultry hanging station;
transferring the retrieved stunned poultry animals to a slaughter facility for further processing; and
conveying empty cages from the stunned poultry hanging station to a final loading area and loading the empty cages on an at least partially empty transport vehicle for transport out of the poultry processing facility.

18. The method of processing poultry for slaughter of claim 17, wherein said conveying the empty cages from the stunned poultry hanging station to the final loading area further comprises conveying the empty cages from the stunned poultry hanging station to an empty poultry cage handling system, washing the empty cages in a cage washer downstream of the hanging station, transporting the washed empty poultry cages from the cage washer to the final loading area, and loading the empty cages on the transport vehicle.

* * * * *